(No Model.) 2 Sheets—Sheet 1.
E. THOMSON.
DYNAMO ELECTRIC MACHINE.
No. 493,313. Patented Mar. 14, 1893.
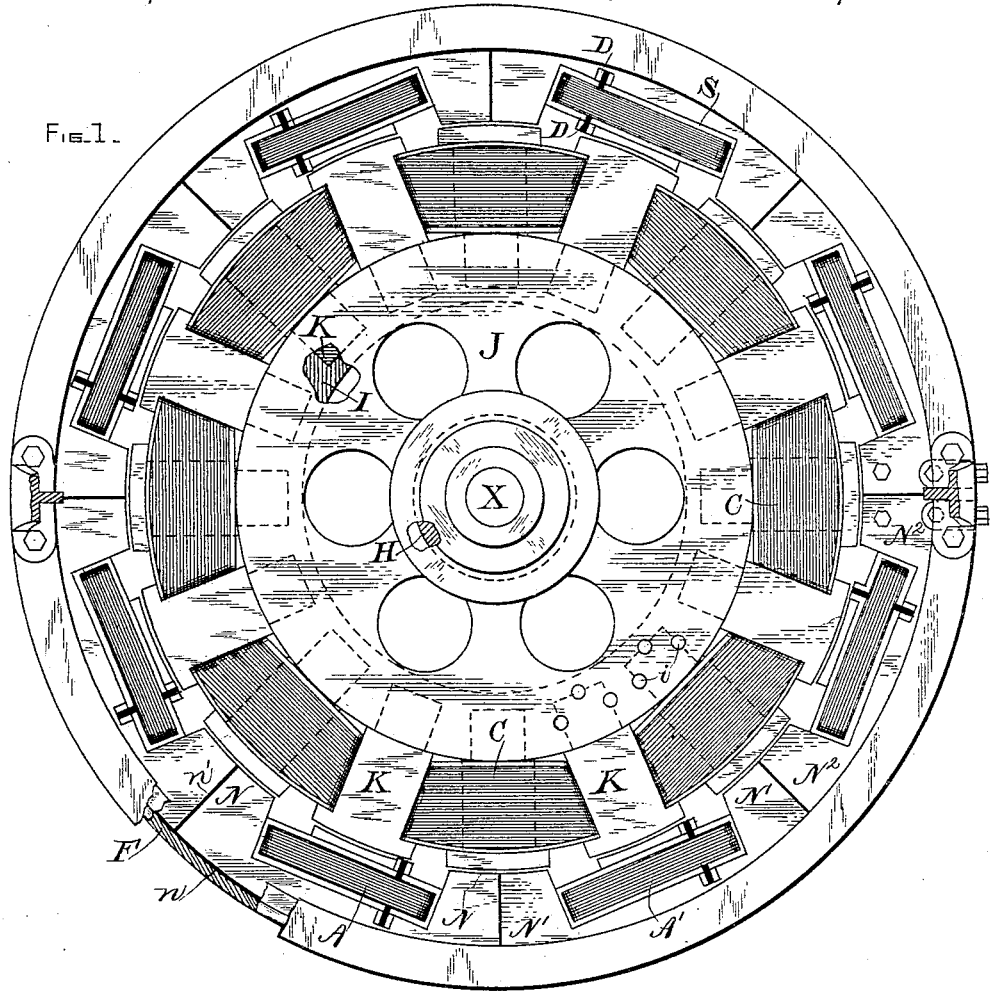
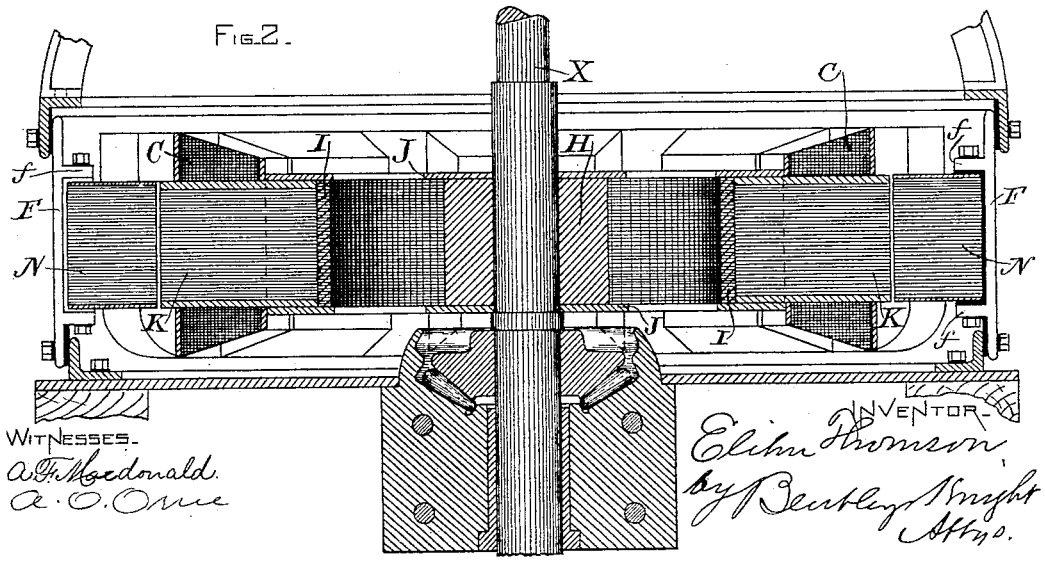
Witnesses:
A. F. Macdonald.
A. O. Orne.
Inventor:
Elihu Thomson
by Bentley Knight
Atty.

(No Model.) 2 Sheets—Sheet 2.

E. THOMSON.
DYNAMO ELECTRIC MACHINE.

No. 493,313. Patented Mar. 14, 1893.

WITNESSES
A. F. Macdonald.
A. C. Orne.

INVENTOR
Elihu Thomson
by Bentley Knight
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

DYNAMO-ELECTRIC MACHINE.

SPECIFICATION forming part of Letters Patent No. 493,313, dated March 14, 1893.

Application filed July 28, 1891. Serial No. 400,942. (No model.)

*To all whom it may concern:*

Be it known that I, ELIHU THOMSON, a citizen of the United States, residing at Swampscott, in the county of Essex and State of Massachusetts, have made certain new and useful Improvements in Dynamo-Electric Machines, of which the following is a specification.

The present invention relates to the construction of dynamo electric machines and motors and similar machinery. It is especially adapted to the construction of alternating current machinery in which high potentials are to be obtained and correspondingly high insulation is necessary. Some features of my invention render it applicable also to the construction of machine which is divisible into moderate sized portions or parts of moderate weight, and which can be assembled in the locality in which the machine is to be used. This is often an important matter where the machines have to be carried into regions difficult of access.

Figure 3:
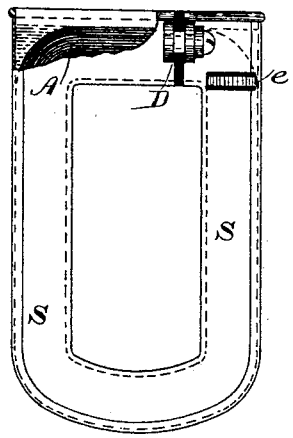
Figure 4:
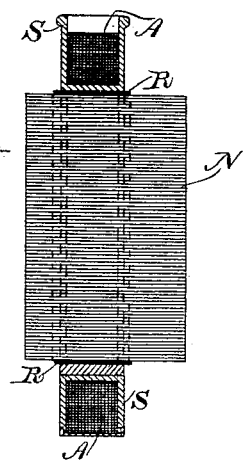
Figure 5:
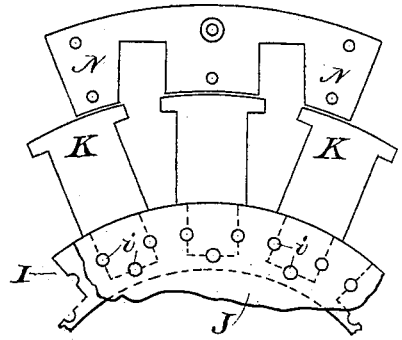
Figure 6:
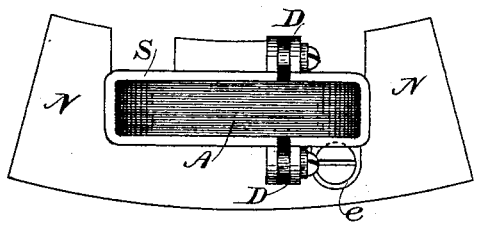

In the accompanying drawings, Figure 1 is a plan of a dynamo electric machine embodying my invention, and designed to produce alternating currents by its being rotated or to utilize alternating currents to produce power or to cause rotation. Fig. 2 is a sectional view of the same. Figs. 3 and 4 show an armature coil inclosed in a body of oil or other insulating substance. Figs. 5 and 6 are details of the core and coil portions.

The machine is shown with its revolving field magnet mounted on a vertical shaft, which may lead to a power transmitting-device.

The connections for carrying out the currents are purposely left out as they may be modified considerably. Neither are any commuting arrangements shown as they would resemble, when used, similar devices employed in like machinery.

The shaft X, Figs. 1 and 2 has surrounding it a hub H, which carries perforated end plates J J preferably of iron. These plates bind between them, suitable bolts being provided as indicated in Fig. 5, the magnetic portion composed of projecting field magnet cores K of the desired number, whose inner ends are entered into recesses into a laminated iron ring I held between the plates J J. The bolts $i$ which hold the structure together pass through the end plates and engage half and half with the laminated ring I and the field magnet cores, so as to operate as keys to retain said cores in place. Each of said field cores may be wound with a coil of insulated wire for magnetizing it, the directions of the windings being such that alternate north and south poles are formed exteriorly by the windings. To simplify the construction, however, I dispense with one half of the coils and wind the coils C on alternate cores, leaving the intervening cores K unwound. This makes fewer parts and lessens the amount of insulation required.

The coils C are wound upon bobbins fitting into the spaces between the field cores, and the field poles are made as shown with overhanging projections at their polar extremities holding the coil bobbins in place during revolution and resisting centrifugal force. The bobbins are introduced into the structure at the moment of putting it together, and the bolts are then inserted to clamp the field projections and the central wheel or carrier firmly together. The current passing through the coils C is such as will simply magnetize the poles to the desired strength and may be a low or high potential current as desired, being preferably taken in the usual manner from a separate or exciting machine.

Outside of the revolving field magnet poles is placed a divided structure of laminated iron on which are supported the armature coil or coils in which the induced currents are set up, such currents being conveyed away for work when the machine is a dynamo, and said coils being utilized when the machine is used as a motor, to receive alternating currents. These currents may be of very high potential and the machine is constructed to allow such a condition while preserving the insulation. The iron portion of the stationary armature, as it would be termed, is made up of blocks of laminated iron N N N′ N′ N², the projections of which extend inward close to the field magnet poles. The armature coils A A' are set into deep notches between the projections on the sections. Outside of these sections and bolted securely to them is an inclosing frame F made in sections bound together in any suitable way, and formed with flanges or shoulders $f$ embracing the armature sections N.

To enable the machine to run at very high voltages, I thoroughly insulate the armature core sections from one another, from the inclosing frame and from the coils.

To enhance the insulation of the coils I prefer to provide a casing or inclosing frame or shell S S, Fig. 3, in which the coil is fitted and in which a body of oil may be placed surrounding the coil, permeating its convolutions and its insulation and water-proofing it, and at the same time making it practically incapable of leakage or destruction by static discharges. While said shell S S might be made of non-conducting material, in which case it could be made in one piece and surround the coil without any special precautions, it is preferable to make it of thin metal on account of toughness and permanence. For this purpose highly resisting alloys would be selected, such as manganese alloys with copper and nickel, or German silver, but in any case the shell or receptacle is to be cut at some point, as at D, and the joint filled with insulating material so that no current can flow around the shell parallel with the wire of the inclosed armature coil A.

The shell or frame with its inclosed coil is to be slipped over the projection of the armature section N N Fig. 6, and secured thereto in any desired way, as by an ear $e$, and a screw entering the same, see Fig. 6. The shell S S is shown open at the top and this would be the case whenever the position of the coil is such that the receptacle can be placed upright, as when the machine is used as shown in the drawings, but it is obvious that the casing may be closed so as to avoid spilling, in case the coils are arranged in other ways or in case the coils themselves are made rotatable instead of the field magnet. Furthermore it is obvious that any number or in fact all of the coils may be included in a single casing, by properly forming and arranging the same.

The coil carriers are preferably insulated from the iron armature section by interposed insulation as indicated at R R, Fig. 4 so that an enhanced insulation is obtained when high potentials are used. In the same way interposed at all points between the armature sections and the frame which supports them is a layer of insulation $n$ which still further prevents grounding while the sections themselves are insulated relatively to one another by interposed insulating material $n'$. A leak from the armature coil would first have to pass the insulation of the coil and the oil surrounding it, then the insulation between the coil carrier or receptacle and the iron segmental portion, such as N N. Further to reach the general frame work of the machine it would require to pass the insulation between the segmental portions N N and the general framework F supporting the same. If the insulation be of mica or other moisture proof material it will on account of these precautions be almost impossible for grounds or short-circuits through the framework to occur.

What I claim as new, and desire to secure by Letters Patent, is—

1. A rotary portion in a dynamo electric machine, comprising a laminated ring having notches in its periphery, laminated core sections inserted into said notches and coils wound around or between said core sections.

2. A dynamo electric machine having a series of core sections, and coils wound on the alternate sections and extending close to the intervening sections.

3. A dynamo electric machine having a series of core sections with projecting pole portions, and coils wound on the alternate sections and extending under the polar projections of the intervening sections.

4. A dynamo electric machine having a rotating portion comprising end-plates, a laminated ring embraced between said end-plates, and having notches, and core sections entered into said notches and bolts engaging with said end-plates, laminated ring and core sections.

5. The combination in a dynamo electric machine, of a core-body portion having a notch and a core-section entered into said notch and one or more bolts engaging half and half into said core-body and core-section.

6. The combination with a pole piece of a dynamo electric machine, of a coil surrounding the same, and an oil casing inclosing said coil, substantially as described.

7. The combination with the coil and its core, of an oil containing casing around the coil and interposed between the coil and core.

8. The combination with the coil and its core, of a metal casing around the coil, and insulation between the said casing and core.

9. The combination of a coil traversed by varying currents, of an oil containing metal casing inclosing said coil, and having its electrical continuity interrupted by an insulating joint, as described.

10. A dynamo electric machine having a series of core sections, separate coils wound thereon, a support surrounding said core sections and clamping the same together, and insulation between the core sections and the support.

11. A dynamo electric machine having a series of laminated core sections, separate coils wound thereon, a support surrounding said core sections and clamping the same together, and insulation between the core sections and the support.

12. A dynamo electric machine having a series of core sections, separate coils wound thereon, a support surrounding said core sections and clamping the same together, and insulation between the core sections and the support, and between the several core sections.

In testimony whereof I have hereto set my hand this 25th day of July, 1891.

ELIHU THOMSON.

Witnesses:
JOHN W. GIBBONEY,
BENJAMIN B. HULL.